US012034210B2

(12) United States Patent
Pucci et al.

(10) Patent No.: US 12,034,210 B2
(45) Date of Patent: Jul. 9, 2024

(54) LEAKY WAVE ANTENNA

(71) Applicant: Telefonaktiebolaget LM Ericsson (publ), Stockholm (SE)

(72) Inventors: Elena Pucci, Stockholm (SE); Oscar Quevedo-Teruel, Stockholm (SE); Oskar Dahlberg, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 198 days.

(21) Appl. No.: 17/423,264

(22) PCT Filed: Feb. 1, 2019

(86) PCT No.: PCT/SE2019/050086
§ 371 (c)(1),
(2) Date: Jul. 15, 2021

(87) PCT Pub. No.: WO2020/159414
PCT Pub. Date: Aug. 6, 2020

(65) Prior Publication Data
US 2022/0077589 A1 Mar. 10, 2022

(51) Int. Cl.
*H01Q 13/26* (2006.01)
*H01Q 13/28* (2006.01)
(Continued)

(52) U.S. Cl.
CPC ............. *H01Q 13/26* (2013.01); *H01Q 13/28* (2013.01); *H01Q 15/0086* (2013.01);
(Continued)

(58) Field of Classification Search
CPC ............................... H01Q 15/02; H01Q 15/10
(Continued)

(56) References Cited

U.S. PATENT DOCUMENTS 10,056,922 B1 * 8/2018 Tsvelykh .................. H01P 1/20
10,374,292 B2 * 8/2019 Frigon ................. H04B 7/0691
(Continued)

OTHER PUBLICATIONS

L. Wang, J. L. Gómez-Tornero and O. Quevedo-Teruel, "Substrate Integrated Waveguide Leaky-Wave Antenna With Wide Bandwidth via Prism Coupling," in IEEE Transactions on Microwave Theory and Techniques, vol. 66, No. 6, pp. 3110-3118, Jun. 2018, doi: 10.1109/TMTT.2018.2818149. (Year: 2018).*
(Continued)

*Primary Examiner* — Hoang V Nguyen
*Assistant Examiner* — Brandon Sean Woods
(74) *Attorney, Agent, or Firm* — COATS & BENNETT, PLLC

(57) ABSTRACT

An antenna device (1) and an antenna stack (20) comprising at least two antenna devices are disclosed. The antenna device comprises a leaky wave antenna structure comprising a waveguide structure (2) extending in a first plane along a first axis (101), wherein the waveguide structure comprises two opposite end portions (3) along the first axis, and a first feed point and a second feed point arranged at opposite end portions of the waveguide structure. The antenna device further comprises a dispersive lens structure (6) having an edge extending along the waveguide structure in the first plane, the dispersive lens structure having an extension along a second axis (102) extending in the first plane in a second direction perpendicular to the first axis. The wave-guide structure further comprises a plurality of discontinuities along an interface between the waveguide structure and the dispersive lens structure for leaking electromagnetic energy into dispersive lens structure.

13 Claims, 4 Drawing Sheets

(51) Int. Cl.
*H01Q 15/00* (2006.01)
*H01Q 15/02* (2006.01)
*H01Q 19/06* (2006.01)
*H01Q 25/00* (2006.01)

(52) U.S. Cl.
CPC ............ *H01Q 15/02* (2013.01); *H01Q 19/06* (2013.01); *H01Q 25/00* (2013.01)

(58) Field of Classification Search
USPC .......................................................... 343/781
See application file for complete search history.

(56) References Cited

U.S. PATENT DOCUMENTS

2009/0298421 A1 12/2009 Andersson et al.
2018/0145728 A1 5/2018 Tsukamoto et al.

OTHER PUBLICATIONS

L. Wang, J. L. Gómez-Tornero, E. Rajo-Iglesias and O. Quevedo-Teruel, "Low-Dispersive Leaky-Wave Antenna Integrated in Groove Gap Waveguide Technology," in IEEE Transactions on Antennas and Propagation, vol. 66, No. 11, pp. 5727-5736, Nov. 2018, doi: 10.1109/TAP.2018.2863115. (Year: 2018).*

Wang, L., et al., "Substrate Integrated Waveguide Leaky-Wave Antenna With Wide Bandwidth via Prism Coupling", IEEE Transactions on Microwave Theory and Techniques, Jun. 1, 2018, pp. 3110-3118, vol. 66, No. 6.

Ebrahimpouri, M., et al., "Design Guidelines for Gap Waveguide Technology Based on Glide-Symmetric Holey Structures", IEEE Microwave and Wireless Components Letters, Jun. 1, 2017, pp. 542-544, vol. 27, No. 6.

Quevedo-Teruel, O., et al., "Glide-Symmetric Fully Metallic Luneburg Lens for 5G Communications at Ka-Band", IEEE Antennas and Wireless Propagation Letters, Sep. 1, 2018, pp. 1588-1592, vol. 17, No. 9.

Wang, L., et al., "Low-Dispersive Leaky-Wave Antenna Integrated in Groove Gap Waveguide Technology", IEEE Transactions on Antennas and Propagation, Nov. 1, 2018, pp. 5727-5736, vol. 66, No. 11.

Ebrahimpouri, M., et al., "Cost-Effective Gap Waveguide Technology Based on Glide-Symmetric Holey EBG Structures", IEEE Transactions on Microwave Theory and Techniques, Feb. 1, 2018, pp. 927-934, vol. 66, No. 2.

Kildal, P.S., et al., "Design and experimental verification of ridge gap waveguide in bed of nails for parallel-plate mode suppression", Published in IET Microwaves, Antennas & Propogation, The Institution of Engineering and Technology, Mar. 7, 2010, pp. 262-270, vol. 5, Iss. 3.

Dahlberg, O., et al., "Fully-metallic, Low-dispersive, Leaky-wave Fed Lens Antenna for 60 GHz Base Station Applications", 12th International Congress on Artificial Materials for Novel Wave Phenomena—Metamaterials, Aug. 27-Sep. 1, 2018, pp. 90-92, Espoo, Finland.

Wang, L., et al., "Low-dispersive Leaky-wave Antenna Integrated in Groove Gap Waveguide Technology", IEEE Transactions on Antennas and Propagation, Jan. 1, 2017, pp. 1-10.

* cited by examiner

LEAKY WAVE ANTENNA

TECHNICAL FIELD OF THE INVENTION

The present invention relates to a leaky wave antennas suitable for mm-wave 5G applications.

BACKGROUND ART

As smart phones and other portable devices increasingly become ubiquitous, and data usage increases, macrocell base station devices and existing wireless infrastructure in turn require higher bandwidth capability in order to address the increased demand. Future wireless communications systems (such as 5G and LTE Advanced Pro) are therefore required to provide increased bandwidth and reduced latencies compared to current system.

In more detail, the predictable features of 5G technology, such as high date rate, low latency, mass devices connection and low power consumption, will play a crucial role in the future society, even though the related technologies are still not finalized. It is envisioned that mm-waves 5G antennas need to provide high gain and narrow steerable beams.

To obtain high gain antennas different solutions can be used: reflectors, antenna arrays, lenses and leaky-wave antennas. Reflectors can be quite bulky and are not really suitable for mobile communications. Antenna arrays can provide beam-forming capabilities with narrow beam and high gain, but they need a feed network, which can be complex to realize at mm-waves due to size constraint and losses caused by the dielectric materials used. Losses affect the antenna gain, therefore for high frequencies it is preferable to use fully metallic structures, which can provide better performance. In addition, solutions incorporating lenses are traditionally expensive and bulky.

Leaky-wave antennas (LWAs) can provide high gain antennas without need for feed networks and can be made all metallic. LWAs are classified as traveling wave antennas and consists of a guiding structure in which discontinuities are introduced, resulting in a leakage of energy that is radiating out of the structure.

However, some general drawbacks of leaky-wave antennas are the dispersion behaviour and limited scanning capabilities. The dispersion behaviour of leaky-wave antennas causes the main beam to be frequency-scanned, which is not desirable for radio links for point-to-point communications, as the unwanted beam squint reduces the bandwidth of operation.

There is therefore a need for an improved antenna solution in the art for point-to-point radio communication and/or point-to-multipoint radio communication.

SUMMARY OF THE INVENTION

It is therefore an object of the present disclosure to provide an antenna device and an antenna stack, which alleviate all or at least some of the above-discussed drawbacks of presently known solutions.

This and other objects are achieved by means of an antenna device and an antenna stack as defined in the appended claims. The term exemplary is in the present context to be understood as serving as an instance, example or illustration.

According to a first aspect of the present invention, there is provided an antenna device comprising a leaky wave antenna structure and a dispersive lens structure. The leaky wave antenna structure has a waveguide structure extending in a first plane along a first axis, the waveguide structure having two opposite end portions along the first axis. The leaky wave antenna structure further has a first feed point and a second feed point, each arranged at a respective end portion of the two opposite end portions of the waveguide structure. The dispersive lens structure has an edge extending along the waveguide structure in the first plane. Furthermore, the dispersive lens structure has an extension along a second axis extending in the first plane in a second direction perpendicular to the first axis. The waveguide structure comprises a plurality of discontinuities along an interface between the waveguide structure and the dispersive lens structure for leaking electromagnetic energy into dispersive lens structure.

An advantage of the proposed antenna device is that it provides for a leaky-wave antenna with lens, which typically works with one fixed beam, to have multi-beam capability without the need for a feed network, thus reducing design complexity and losses. Also, the design allows for integrating filters directly in the leaky wave antenna structure and/or dispersive lens structure (i.e. lens metal board) and thereby reducing the number of interconnections in between components and increasing the overall efficiency. In more detail, multi-beam antennas are wanted for 5G applications. Conventional antenna arrays can provide beam-scanning capabilities, but they need feed networks which can be complex to realize at mm-waves.

Further, according to an exemplary embodiment, the dispersive lens structure is arranged such that a first main beam direction associated with an excitation of a first feed point is at an angle θ 20%, relative to the second axis, and a second beam direction associated with an excitation of a second feed point is at an angle −θ±20%, relative to the second axis. Note that the angles are labelled as positive and negative in order to differentiate the two different beam directions with respect to the second axis. This may for example be achieved by realizing the dispersive lens structure as a 2D prism in the form of an isosceles triangle having its based extending along the waveguide structure, and the inclination angles approximately equal to θ.

Thus, according to another exemplary embodiment, the dispersive lens structure forms a dispersive two-dimensional prism that is symmetric with respect to the second axis.

Furthermore, integrated antenna and filters solutions are difficult to be realized within an antenna array, as the filter size can be larger than the available space within the antenna element unit cell. Surface mounted filters can be used and connected to the PCB, but when an all-metal structure is desired, the filter-antenna integration becomes more complex in a conventional antenna array environment.

Therefore, according yet another exemplary embodiment, the dispersive lens structure and/or the waveguide structure comprise(s) an integrated filter arrangement. Since the proposed antenna device allows for integrated filter solutions, the antenna device can be made all metallic which is desirable for mm-wave frequencies.

Still further, according to a second aspect of the present invention, there is provided an antenna stack comprising at least two antenna devices according any one of the embodiments of the above-discussed first aspect of the present invention. With this aspect of the invention, similar advantages and preferred features are present as in the previously discussed first aspect of the invention.

According to an exemplary embodiment of the present invention, the first feed point of each antenna device (in the antenna stack) is connected to a first common feed point via a first switch arrangement. The second feed point of each antenna device (in the antenna stack) is connected to a second common feed point via a second switch arrangement. The first switch arrangement is configured so that each first feed point is selectively and individually connectable to the first common feed point, and the second switch arrangement is configured so that each second feed point is selectively and individually connectable to the second common feed point.

By stacking two or more antenna devices and incorporating a switching arrangement at the end portions of the waveguides, beam steering capability is obtained. In more detail, the beam can be steered by phase shifting the signals to each element (antenna device) in the formed array.

The design of the leaky-wave antenna with a prism as described above does not only solve one of two main drawbacks of leaky-wave antennas, i.e. their dispersive behaviour. In contrast to the currently known solutions, which are only capable of providing a single fixed beam antenna, the proposed solution solves the other problem of providing beam-scanning capability.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
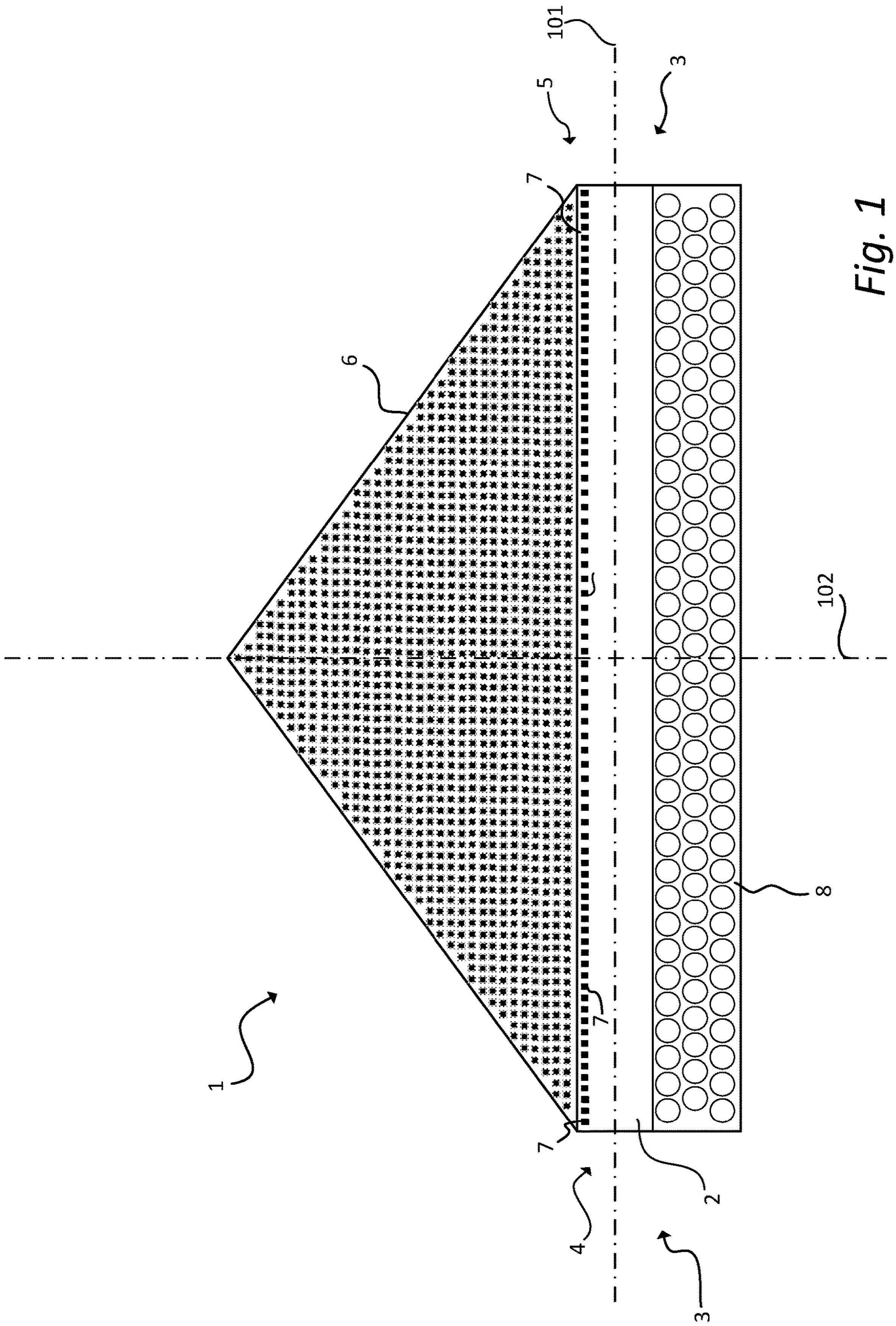
FIG. 1 is a schematic illustration of an antenna device according to an embodiment of the present invention.

FIG. 1 is a schematic top-view illustration of an antenna device 1 according to an exemplary embodiment of the present invention. The antenna device 1 comprises a leaky wave antenna structure with a waveguide structure 2 extending in a first plane along a first axis 101.

The waveguide structure 2 has two opposite end portions 3 along the first axis 101. In other words, the end portions 3 are arranged on opposite sides of a second axis 102 perpendicular to the first axis 101. The leaky wave antenna structure further has a first feed point 4 and a second feed point 5, each arranged at a respective end portion 3 of the waveguide structure 2.

Further, the antenna device 1 comprises a (frequency) dispersive lens structure 6 having an edge extending along the waveguide structure 2 in the first plane. The dispersive lens structure 6 also has an extension along the second axis 102 extending in the first plane in a second direction perpendicular to the first axis 101. The waveguide structure 2 further has a plurality of discontinuities 7 along an interface between the waveguide structure 2 and the dispersive lens structure 6 for leaking electromagnetic energy into the dispersive lens structure 6. Stated differently, a leakage is introduced along the edge of the waveguide structure 2 facing the dispersive lens structure 6.

Moreover, the dispersive lens structure 6 can be understood as a two-dimensional (2D) lens, defined by the three outer edges which indicate the interfaces in which the leaky-mode (propagating in the waveguide structure 2) is dispersedly refracted, resulting in a frequency independent final radiation.

The dispersive lens structure 6 comprises a metasurface. Metasurfaces can be understood as materials that are designed to control the propagation of electromagnetic waves. They are generally formed as periodic structures to create a stop-band of the propagating waves in a certain frequency range and to allow propagation of the electromagnetic waves only along desired/defined directions. In this way, unwanted radiations, leakage and surface waves can be reduced, resulting in antenna structures that can be realized in a simpler and more cost effective way.

The dispersive lens structure 6 is in FIG. 1 illustrated in the form of a dispersive two-dimensional prism. The prism is symmetric with respect to the second axis 102. In more detail, the dispersive lens structure forms an isosceles triangle having a pin-type metasurface. The dispersive lens structure 6 may be realized in alternative ways, and may comprise periodic structures other than the illustrated metal pins, such as e.g. an array of holes on a metal surface or an array of protrusions having other shapes than the illustrated pins. Further, a length of the edge of the dispersive lens structure 6 extending along the waveguide structure 2 is substantially the same length as a length of the waveguide structure 2 along the first axis 101. Substantially the same length is in the context of the present application to be interpreted as exactly the same ±20% (of the total length), preferably exactly the same length ±15% (of the total length), or more preferably exactly the same length ±10% (of the total length).

Further, the waveguide structure 2 is in FIG. 1 illustrated in the form of a gap waveguide. The antenna device 1 further comprises an Electromagnetic Band Gap (EBG) structure 8 extending along the waveguide structure 2 on an opposite side of the waveguide structure 2 relative to the dispersive lens structure 6. The EBG structure 8 serves the purpose of blocking electromagnetic radiation in the "back direction", i.e. away from the dispersive lens structure 6. Moreover, EBG structures using high-symmetries are particularly suitable for mm-wave applications as they can achieve wide band-gaps and can be realized in a relatively simple way, for example by merely drilling holes in the metal surface. Thus, EBG structures are attractive for these frequencies where the dimensions are quite small and manufacturing techniques can be complex and expensive. However, as an alternative the antenna device 1 may comprise a solid metal wall arranged on an opposite side of the waveguide structure 2 relative to the dispersive lens structure 6 in order to block electromagnetic radiation in the "back direction". The waveguide structure 2 and/or the dispersive lens structure 6 may comprise an integrated filter (not shown). One possible filtering solution may for example be providing further discontinuities (e.g. drilling holes) in the waveguide structure 2. However, as mentioned the filtering means may be provided in other ways (e.g. by filtering in the EBG structure 8 or in the dispersive lens 6). The filtering characteristic may for example be controlled by controlling a size and/or a position of the EBG structure 8 or the metasurface structures of the dispersive lens 6. Moreover, control of a radiation pattern characteristics can be implemented by varying the dimensions of the single row of square pins 7 (i.e. the discontinuities 7).

Still further, the antenna structure 1 is centre-symmetric (i.e. symmetric with respect to the second axis 102). The antenna structure 1 is capable of radiating energy in two directions, depending on which feeding point 4, 5 is used. This is further elucidated in FIG. 2.

Figure 2:
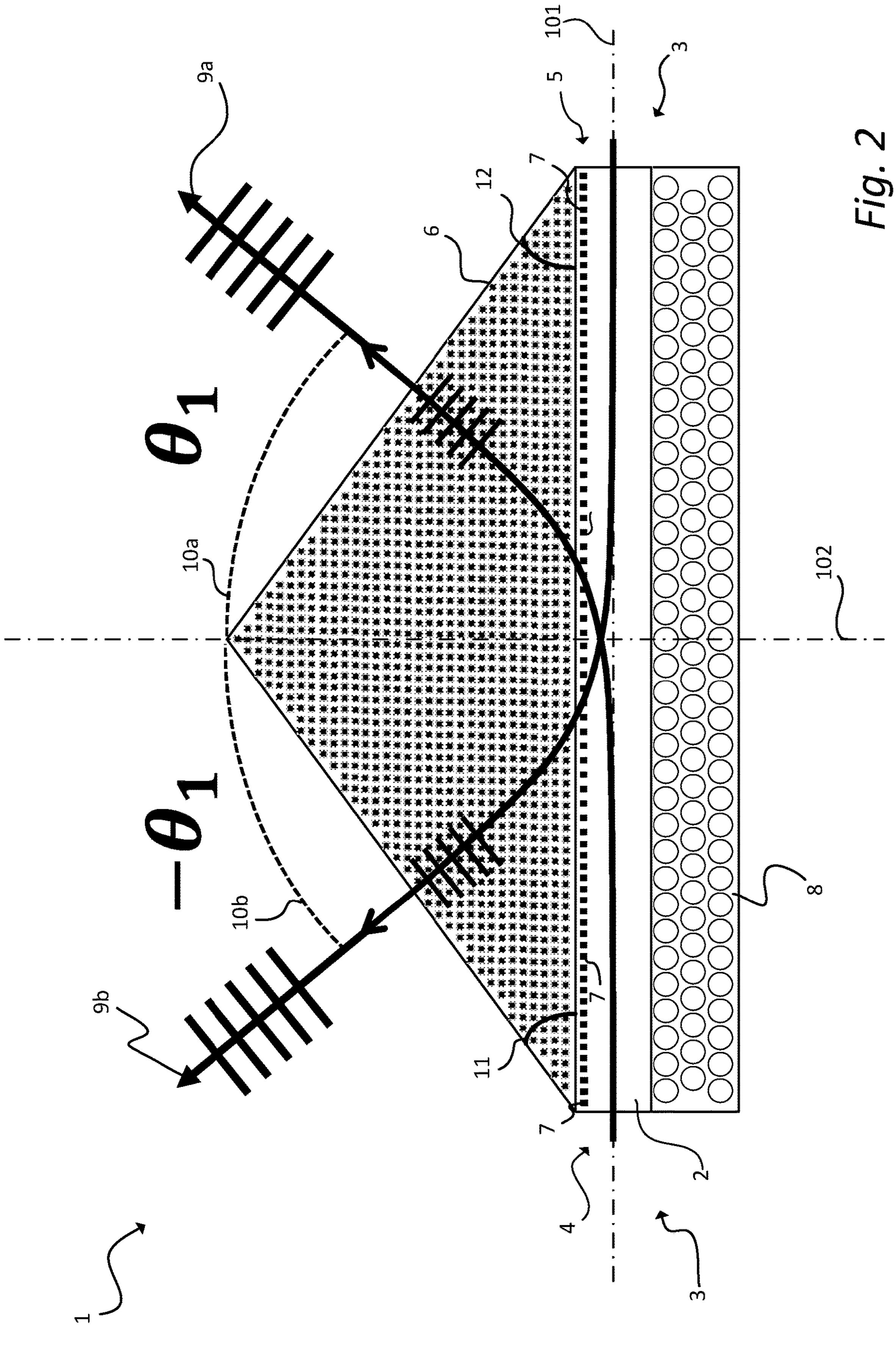
FIG. 2 is a schematic illustration of the antenna device of FIG. 1 with an indicated beam path according to an embodiment of the present invention.

FIG. 2 shows a top view illustration of the antenna device 1 from FIG. 1 where two radiation paths through and out of the antenna device 1 are indicated. In more detail, by feeding/exciting the antenna device 1 from the first feed point 4, the antenna device will radiate energy in a first direction (indicated by the arrow 9*a*). By feeding/exciting the antenna device from the second feed point 5, the antenna device will radiate energy in a second direction (indicated by the arrow 9*b*), different from the first direction. The radiation will have a maximum intensity at a defined angle $\pm\theta_1$ (sign depends on feeding point/port) with respect to the second axis 102. According to an exemplary embodiment, the inclination angles 11, 12 of the lens structure 6 are substantially the same as the angles 10*a*, 10*b* between the second axis 102 and the direction of maximum radiation intensity 9*a*, 9*b*.

Stated differently, the prism design is made symmetric, with respect to second axis 102. Hence, beam-switching is enabled and thus electrical steerability in one plane (the first plane spanned by the first axis 101 and the second axis 102). One independent beam can radiate at each side of the prism 6, thus getting two beams 9*a*, 9*b*. The beams 9*a*, 9*b* can be arranged to radiate at the same angle 10*a*, 10*b*, but in “opposite” directions (for example +45 degrees and −45 degrees).

Even though, the dispersive lens structure 6 is illustrated in the form of an isosceles triangle in the figures, prisms of other geometrical shapes are feasible and within the scope of the present invention. For example, if triangular prisms are employed the inclination angles 11, 12 need not be the same, and the dispersive lens structure need not be symmetric with respect to the second axis 102.

Further, by having two feed points it provides for beam-switching capability by either feeding the antenna device from the first feed point 4 or the second feed points 5. Moreover, in order to adjust or control the radiation direction 9*a*, 9*b* one can adjust properties of the dispersive lens structure 6, either in terms of refractive properties, inclination angles 11, 12, or both. If the inclination angles 11, 12 are below a predefined threshold, a simultaneous excitation of both feed points 4, 5 of the waveguide structure 2 will result in a merging of the radiation patterns 9*a*, 9*b* and accordingly broadside radiation.

Figure 3:
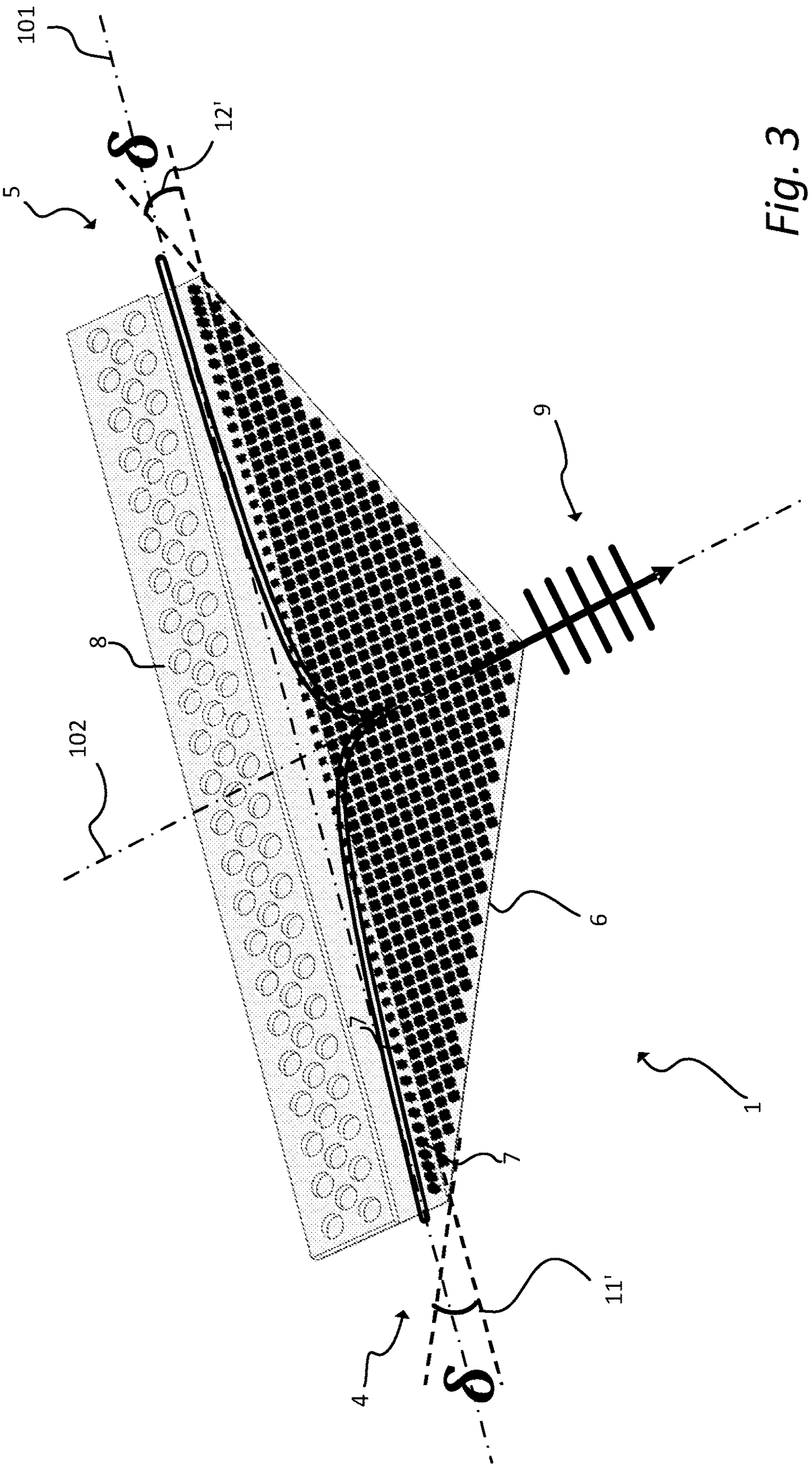
FIG. 3 is a schematic illustration of an excited antenna device according to an embodiment of the present invention.

This is illustrated in FIG. 3, showing a top perspective view of an antenna device 1 according an exemplary embodiment of the present invention. Here, the inclination angles of the dispersive lens structure 6 are below a predefined threshold value, and both the first feed point 4 and the second feed point 5 are excited simultaneously, resulting in broadside radiation 9. In FIG. 3 the vertically opposite angles 11', 12' are indicated in the illustration for clarity reasons, however, as the skilled reader realizes, the vertically opposite angles 11', 12' are equal to the inclination angles of the isosceles triangle forming the 2D prism of the dispersive lens.

Figure 4:
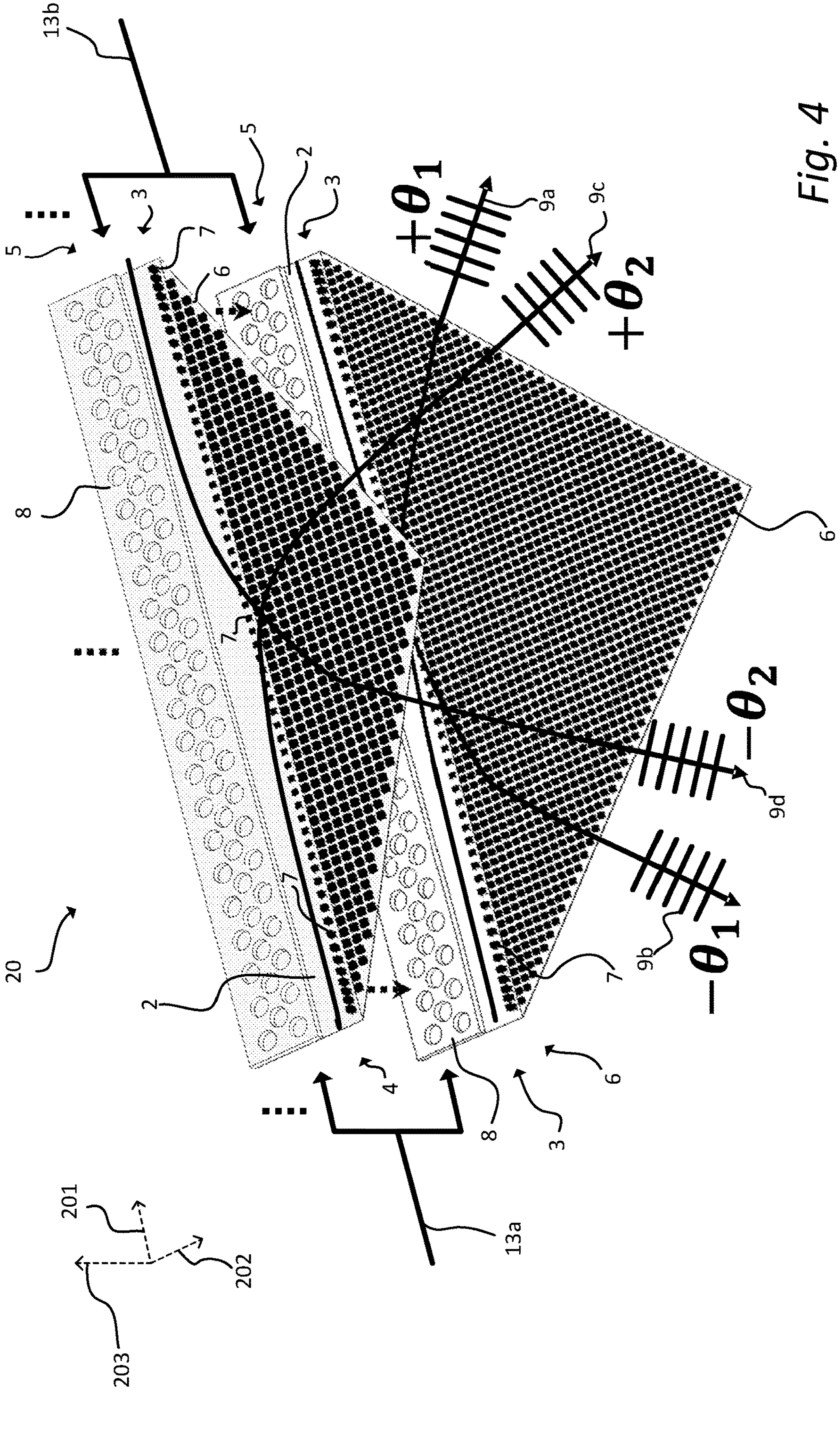
FIG. 4 is a schematic illustration of an excited antenna stack according to an embodiment of the present invention.

FIG. 4 shows a perspective view of an antenna stack 20 according to an exemplary embodiment of the present invention. The antenna stack 20 has a plurality (only two are illustrated) antenna devices stacked along a third axis 203, substantially parallel to the first plane. Thus, the three axes can be said to form a three dimensional Cartesian coordinate system as illustrated by the three axes 201, 202, 203. The antenna stack 20 has a first common feed point 13*a* and a second common feed point 13*b*. The first feed point 4 of each antenna device in the antenna stack 20 is connected to the first common feed point 13*a* via a first switch arrangement (only schematically indicated by the bifurcated arrow). The second feed point 5 of each antenna device in the antenna stack 20 is connected to the second common feed point 13*b* via a second switch arrangement (only schematically indicated by the bifurcated arrow).

Each switch arrangement is configured so that each corresponding feed point 4 of each antenna device is selectively and individually connectable to the respective common feed point 13*a*. In other words, it is possible to choose which one of the plurality of antenna devices that is to be activated, and also by selecting a specific feed point one can also control the direction of the main beam 9*a*, 9*b*, 9*c*, 9*d*. The switching arrangement can be realized by any appropriate means as known in the art, such as e.g. by utilizing varactor diodes, mechanical switching, etc.

Further, in accordance with another exemplary embodiment, two or more of the antenna devices in the antenna stack 20 are identical. In that case, a one-dimensional (1D) 1D array configuration is obtained, which extends in the orthogonal direction from the first plane (i.e. the plane spanned by the first axis and the second axis). In more detail, in this configuration the beam can be steered by phase shifting the signals to each element (antenna device) in the 1D array (c.f. phased array operation), whereby beam-scanning in a plane orthogonal to the first plane is enabled.

Still further, the antenna stack 20 may comprise a stack configuration in which every other antenna device is identical, i.e. two directly adjacent antenna devices have different dispersive lens structures 6 (e.g. different inclination angles).

The present disclosure has been presented above with reference to specific embodiments. However, other embodiments than the above described are possible and within the scope of the disclosure. Thus, the different features of the embodiments may be combined in other combinations than those described.

The invention claimed is:

1. An antenna device, comprising:

a leaky wave antenna structure comprising:

a waveguide structure extending in a first plane along a first axis, wherein the waveguide structure comprises two opposite end portions along the first axis;

a first feed point and a second feed point arranged at opposite end portions of the waveguide structure;

a dispersive lens structure having an edge extending along the waveguide structure in the first plane, the dispersive lens structure having an extension along a second axis extending in the first plane in a second direction perpendicular to the first axis;

wherein the waveguide structure comprises a plurality of discontinuities along an interface between the waveguide structure and the dispersive lens structure for leaking electromagnetic energy into dispersive lens structure;

wherein the dispersive lens structure is configured such that a first main beam direction associated with an excitation of a first feed point is at an angle $\theta\pm20\%$ relative to the second axis; and wherein a second beam direction associated with an excitation of a second feed point is at an angle $-\theta\pm20\%$, relative to the second axis.

2. The antenna device of claim 1, wherein the dispersive lens structure is in the form of an isosceles triangle having two angles $\gamma$, wherein the angles $\gamma$ are equal to $\theta\pm20\%$.

3. The antenna device of claim 1, wherein the dispersive lens structure is in the form of an isosceles triangle having two angles γ, wherein the angles γ are below a predefined threshold.

4. The antenna device of claim 1, wherein the dispersive lens structure is geometrically symmetric with respect to the second axis.

5. The antenna device of claim 4, wherein the dispersive lens structure forms a dispersive two-dimensional prism which is symmetric with respect to the second axis.

6. The antenna device of claim 1, wherein the dispersive lens structure comprises a metasurface.

7. The antenna device of claim 6, wherein the metasurface is a pin-type metasurface.

8. The antenna device of claim 1, wherein a length of the edge extending along the waveguide structure is substantially the same as a length of the waveguide structure along the first axis.

9. The antenna device of claim 1, wherein the dispersive lens structure comprises an integrated filter arrangement.

10. The antenna device of claim 1, wherein the waveguide structure comprises an integrated filter arrangement.

11. The antenna device of claim 1:
wherein the waveguide structure is a gap waveguide; and
the antenna device further comprising an Electromagnetic Band Gap (EBG) structure extending along the waveguide structure on an opposite side of the waveguide structure relative to the dispersive lens structure.

12. An antenna stack, comprising:
at least two antenna devices, wherein each antenna device comprises:
a leaky wave antenna structure comprising:
a waveguide structure extending in a first plane along a first axis, wherein the waveguide structure comprises two opposite end portions along the first axis;
a first feed point and a second feed point arranged at opposite end portions of the waveguide structure;
a dispersive lens structure having an edge extending along the waveguide structure in the first plane, the dispersive lens structure having an extension along a second axis extending in the first plane in a second direction perpendicular to the first axis;
wherein the waveguide structure comprises a plurality of discontinuities along an interface between the waveguide structure and the dispersive lens structure for leaking electromagnetic energy into dispersive lens structure;
wherein the dispersive lens structure is configured such that a first main beam direction associated with an excitation of a first feed point is at an angle $\theta \pm 20\%$ relative to the second axis; and
wherein a second beam direction associated with an excitation of a second feed point is at an angle $-\theta+20\%$, relative to the second axis;
wherein the at least two antenna devices are stacked along a third axis substantially perpendicular to the first plane.

13. The antenna stack of claim 12:
wherein the first feed point of each antenna device is connected to a first common feed point via a first switch arrangement;
wherein the second feed point of each antenna device is connected to a second common feed point via a second switch arrangement;
wherein the first switch arrangement is configured so that each first feed point is selectively and individually connectable to the first common feed point; and
wherein the second switch arrangement is configured so that each second feed point is selectively and individually connectable to the second common feed point.

* * * * *